United States Patent
Ahn et al.

(10) Patent No.: US 10,949,552 B2
(45) Date of Patent: Mar. 16, 2021

(54) WHOLE APPARATUS HAVING AN AUTHENTICATION ARRANGEMENT, AND METHOD FOR AUTHENTICATION

(71) Applicant: AUDI AG, Ingolstadt (DE)

(72) Inventors: Changsup Ahn, Ingolstadt (DE); Kamil Zawadzki, Munich (DE); Markus Klein, Pförring (DE); Hans-Georg Gruber, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/605,149

(22) PCT Filed: Jul. 5, 2018

(86) PCT No.: PCT/EP2018/068170
§ 371 (c)(1),
(2) Date: Oct. 14, 2019

(87) PCT Pub. No.: WO2019/020335
PCT Pub. Date: Jan. 31, 2019

(65) Prior Publication Data
US 2020/0349268 A1 Nov. 5, 2020

(30) Foreign Application Priority Data
Jul. 28, 2017 (DE) .......................... 102017213010.5

(51) Int. Cl.
*G06F 21/60* (2013.01)
*G06F 13/42* (2006.01)
(Continued)

(52) U.S. Cl.
CPC ........ *G06F 21/606* (2013.01); *G06F 13/4221* (2013.01); *G06F 21/602* (2013.01);
(Continued)

(58) Field of Classification Search
CPC ...... G06F 21/602; G06F 21/606; G06F 21/78; G06F 13/4221; G06F 2221/2153; G06F 2213/0026; H04L 69/22
(Continued)

(56) References Cited

U.S. PATENT DOCUMENTS 7,418,598 B1  8/2008  Le Quere
9,614,669 B1* 4/2017  Cox, Jr. ............... H04L 63/0435
(Continued)

FOREIGN PATENT DOCUMENTS

CN  102546603 A  7/2012
CN  103093130 A  5/2013
(Continued)

OTHER PUBLICATIONS

NPL Search Results (Year: 2020).*
(Continued)

*Primary Examiner* — Syed A Zaidi
(74) *Attorney, Agent, or Firm* — Sterne, Kessler, Goldstein & Fox P.L.L.C.

(57) ABSTRACT

An apparatus includes an authentication arrangement for a communication connection, using a communication protocol, between two data processing devices of the apparatus. The data processing devices each have an interface unit for the communication connection and a computation unit. The interface units each have an encryption/decryption device, where the encryption/decryption device is at least partially produced by hardware for encrypting at least some of the user data to be transmitted via the communication connection as part of the authentication arrangement. The encryption/decryption device can be applied in a communication layer of the communication protocol to the user data prepared for the physical user data transmission or to the physically received user data. Each data processing device (Continued)

has a security unit, implemented as dedicated hardware that the computation unit cannot access and/or in a manner logically isolated from the computation unit. The security unit produces a trusted execution environment, of the authentication arrangement with a hardware-encoded key information, on the basis of which the user data are encrypted by the encryption/decryption device.

18 Claims, 2 Drawing Sheets

(51) Int. Cl.
*G06F 21/78* (2013.01)
*H04L 29/06* (2006.01)

(52) U.S. Cl.
CPC .............. *G06F 21/78* (2013.01); *H04L 69/22* (2013.01); *G06F 2213/0026* (2013.01); *G06F 2221/2153* (2013.01)

(58) Field of Classification Search
USPC .......................................................... 726/26
See application file for complete search history.

(56) References Cited

U.S. PATENT DOCUMENTS

| | | | |
|---|---|---|---|
| 2003/0046562 A1* | 3/2003 | Uchikubo | A61B 1/042 713/189 |
| 2006/0117177 A1* | 6/2006 | Buer | G06F 21/72 713/155 |
| 2009/0060197 A1* | 3/2009 | Taylor | H04L 9/0618 380/277 |
| 2011/0055564 A1 | 3/2011 | Porsch et al. | |
| 2012/0155645 A1 | 6/2012 | Prochaska et al. | |
| 2015/0172054 A1 | 6/2015 | Prakash et al. | |
| 2016/0285857 A1* | 9/2016 | Jakobsson | G06Q 20/40 |
| 2016/0315762 A1 | 10/2016 | Moon et al. | |
| 2016/0350555 A1 | 12/2016 | Deleeuw et al. | |
| 2018/0068107 A1 | 3/2018 | Takemori et al. | |
| 2019/0334721 A1* | 10/2019 | Li | G06F 21/602 |

FOREIGN PATENT DOCUMENTS

| | | |
|---|---|---|
| DE | 199 55 545 A1 | 5/2001 |
| DE | 600 20 794 T2 | 5/2006 |
| DE | 10 2009 027 676 A1 | 1/2011 |
| EP | 3276876 A1 | 1/2018 |
| WO | WO 2016/152556 A1 | 9/2016 |
| WO | WO 2016/154496 A1 | 9/2016 |

OTHER PUBLICATIONS

NPL Search Terms (Year: 2020).*
International Search Report and Written Opinion of the International Searching Authority, directed to related International Patent Application No. PCT/EP2018/068170, dated Oct. 23, 2018, with attached English-language translation; 21 pages.
International Preliminary Report on Patentability directed to related International Patent Application No. PCT/EP2018/068170, completed Jul. 8, 2019, with attached English-language translation; 14 pages.

* cited by examiner

WHOLE APPARATUS HAVING AN AUTHENTICATION ARRANGEMENT, AND METHOD FOR AUTHENTICATION

TECHNICAL FIELD

The disclosure relates to a whole apparatus having an authentication arrangement for a communication connection, using a communication protocol, between two data processing devices of the whole apparatus, wherein the data processing devices each have an interface unit for the communication connection and a computation unit, particularly a CPU, and/or a GPU, and/or an FPGA, and/or a ASIC. In addition, the disclosure relates to a method for authentication.

BACKGROUND

Modern whole apparatuses with data processing systems, such as automobiles, are becoming increasingly complex due to the multiplicity of tasks to be performed and/or the advancement of data processing capabilities. If, for example, a motor vehicle is to be designed for a fully automatic, i.e., autonomous operation, data processing systems with high computing power are required in order to be able to securely process the environment of the motor vehicle and to be able to undertake safe trip planning. In addition to such autonomous operating options in motor vehicles as whole apparatuses, there are also increasing communication options in the area of information technology, for example, connections to clouds, to the infrastructure, and the like. Even the motor vehicle as a service platform is increasingly becoming the center of attention.

Data processing systems of whole apparatuses, such as motor vehicles, are usually constructed from a multiplicity of data processing devices, which themselves can exhibit high performance capabilities, wherein, however, a fast and straightforward data transmission between the data processing devices via appropriate communication connections must also be ensured. For example, the communication standard "PCI Express" (often also called PCIe) can be used as a modern, fast communication technology. It is a point-to-point communication standard, which, however, can be extended by interposing bridge devices, particularly switches, hubs, multiplexers/demultiplexers, or the like. The advantage of PCI Express is particularly the high-speed communication, "DMA by design" and the fact that many compatible devices are already available on the market.

In a data processing device, the communication connection is usually established via corresponding interface units, for example, a PCIe microchip. Bridge devices (switches, hubs, multiplexers, demultiplexers) can be designed as a single microchip ("system on a chip" or SoC) or as a multi-chip device. The actual communication partners (data processing devices) are usually referred to as "endpoints" and can include an operating system and/or a driver, wherein the handling of the interrupts and read/write operations can be performed by the driver.

The problem with whole apparatuses, such as motor vehicles which differ significantly from personal computers, is that their data processing systems are based on a modular concept, wherein the communication connections are physically accessible for attacks. In turn, this means that unauthorized data processing devices, such as control devices, can also access the communication connections and import their own user data, which possibly do not meet the requirements for automotive quality and/or safety, and so a compromised and/or added "endpoint" can also pose a security problem to the rest of the data processing system. This applies especially to communication standards that allow direct access to components of communication partners, such as storage means and the like.

The disclosure therefore addresses the problem of providing an option for increasing the security in data processing systems of whole apparatuses which operate with modern, fast, less secure communication standards, and particularly allowing for an authentication of the data processing devices among one another.

DETAILED DESCRIPTION

Figure 1:
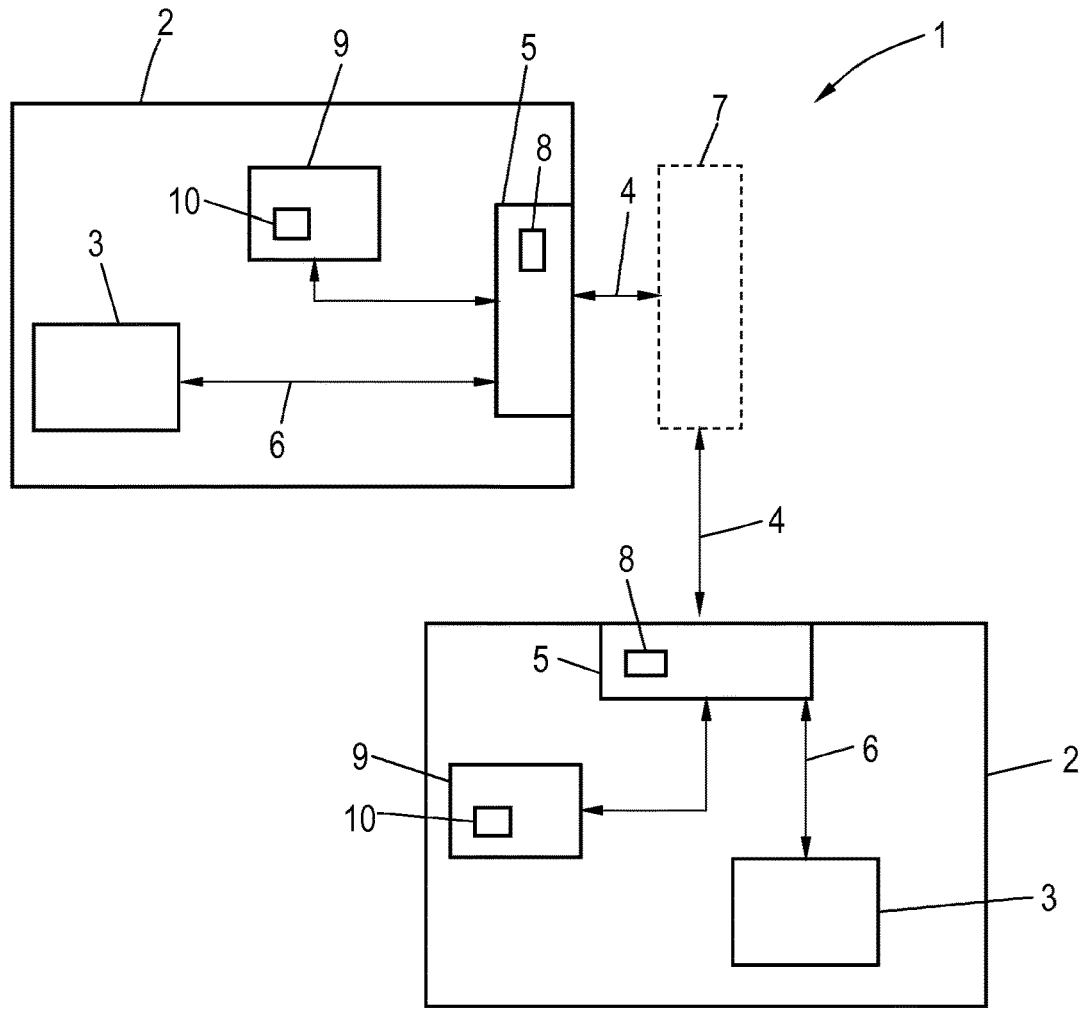
FIG. 1 shows a schematic diagram of a whole apparatus, according to some embodiments of the disclosure.

In order to solve above problem, it is provided, according to the disclosure, in a whole apparatus of the initially described type that the interface units each have a cryptographic encryption/decryption device, at least partially produced by hardware, for encrypting at least some of the user data to be transmitted via the communication connection as part of the authentication arrangement. The encryption/decryption device can be applied in a particularly non-application-oriented communication layer of the communication protocol to the user data prepared for the physical user data transmission or to the physically received user data. Each data processing device has a security unit, implemented as dedicated hardware that the computation unit cannot access, and/or in a manner logically isolated from the computation unit, and producing a trusted execution environment. With the authentication arrangement, in each case on the basis of at least one piece of hardware-encoded key information, the user data are encrypted by the encryption/decryption device.

The disclosure therefore proposes an authentication arrangement which is realized as hardware and thus less susceptible to manipulations. The authentication arrangement allows for a mutual authentication of the data processing devices at least implicitly, but preferably in an authentication process, via the option for secure communication via the communication connection. This is based on the hard-coded key information in the hardware of the security unit, which cannot be accessed by the computation unit. The hard-coded key information can be adapted for at least one pair of data processing devices, each to be authenticated against one other, wherein the encryption information for a pair of communicating data processing devices can be based on symmetric encryption but also on asymmetric encryption. In the case of symmetric encryption, the encryption information comprises at least one identical base key, particularly for all data processing devices. In the case of asymmetric encryption, each key information contains at least its own private key and the public keys of all communication partners provided and to be authenticated.

In this case, as indicated, the authentication can essentially take place implicitly by the encryption concept described herein, wherein an explicit authentication process can preferably be used, particularly at the beginning of each communication session in the course of or in addition to negotiating a session key or entirely without a key negotiation. Any basically known authentication processes can be used. Expediently, an authentication takes place at the beginning of a communication session, after which a negotiation of a session key takes place upon a successful authentication. Unauthenticated data processing devices, such as correspondingly compromised and/or replaced data processing devices, are "not understood," unable to authenticate themselves, or discovered by the absence of any encryption. The present disclosure therefore ensures that only authorized data processing devices (i.e., having matching/adapted key information) can communicate as intended.

The security unit produces a trusted execution environment (TEE). In addition to the hardware-encoded key information, the security unit also includes a hardware-produced and/or isolated operating system for key management and possibly execution of an authentication process and/or key negotiation when a session key is supposed to be negotiated for the current communication session, as shall be described in more detail below.

In some embodiments, the present disclosure provides, as new components of an authentication arrangement, the security unit as a trusted execution environment which contains and manages the key information, and a cryptographic encryption/decryption device which lies as close as possible to the user data to be transmitted physically, particularly in a transport layer and/or a communication layer. With the trusted execution environment, the security unit thus provides an execution context that is isolated from the normal operating system of the data processing device. The key management and the secure storage of the key information is supposed to take place in the security unit in the same way as possibly provided secure calculations, such as key generation, authentication process, and key negotiation (key agreement).

In summary, this results in a strong authentication of each data processing device of the whole apparatus, particularly of the motor vehicle, with the option of extending the data processing system of the motor vehicle with authorized partners. For example, suitable key information to be hardware-encoded can be passed on to appropriate cooperation partners. In this case, the term "hardware-encoding" means that the keys are written into the security unit, possibly in the form of a circuit, and subsequently designed by known means to be unalterable.

Unknown third-party data processing devices can be avoided because the secure communication is impossible, and/or the authentication/negotiation of session keys fails. Due to the outsourcing of the authentication in hardware components, the quality inspection of software components of the data processing devices is simplified because the authentication takes place at a hardware level. The disclosure allows the prevention of physical modification measures and attacks, which is particularly advantageous for whole apparatuses, such as motor vehicles, because here the communication connections are physically accessible with relative ease. As a result, the encrypted user data cannot be recognized by an external analysis means. Overall, the described concept must be labeled as application-transparent because all protection mechanisms are implemented in hardware and possibly low-level software.

It must also be noted that various options exist for the actual hardware encoding of the key information. For example, it is conceivable that the key information is already determined at the manufacturer of the security unit, which can be designed, for example, as a separate microchip, and introduced into the security unit in a hardware-encoded manner. However, a manufacturer of the whole apparatus itself can also hardware-encode the key information, for example, in the case of a motor vehicle, at the end of the assembly line. For that purpose, it can be provided that a provisional master key is present within the security unit and can be used to supplement and hardware-encode the dedicated key information and finally lock the not yet closed microchip of the security unit ("fusing"). This applies both to symmetric key information, thus particularly to common base keys, as well as asymmetric key information.

In some embodiments, the communication layer is a transport layer, and/or a transaction layer. In some embodiments, the communication protocol is packet-based, particularly PCI Express. Therefore, in some embodiments, PCI Express (PCIe) can be selected as the communication protocol (communication standard), in which case the encryption/decryption device is preferably assigned to a transaction layer, and is thus applied to the user data prepared for the physical transport and appropriately formatted, specifically TLPs (Transaction Layer Packages).

In some embodiments, in a packet-based communication protocol, only one, particularly dynamically or user-adjustable, portion of the user data packets to be transmitted is encrypted, wherein the encryption state in an information unit, particularly an encryption bit, of the header of the respective user data packet is displayed. In order to save encryption and decryption efforts, it is thus conceivable to perform only a partial encryption, for which a corresponding encryption bit is preferably set accordingly within the header of the user data packets if an encryption is present. In general, this can also be called an encryption indicator. The rate of encryption can be selected by a user, for example, predetermined by a manufacturer of the whole apparatus in a hardware-encoded manner, but it can also be dynamically adaptable, so that, for example, it can be provided that the rate of encrypted user data packets is selected on the basis of a desired data transmission rate for the user data. In this manner, a balance can be created between the security offered by encryption and the saving of expenditures for high data rates.

In some embodiments, the security unit has at least one protection mechanism against a reading or reading out of the key information. For example, special microchips have already been proposed, in which a stored circuit/a stored key information still becomes unreadable in case of a physical intrusion into the microchip. For example, the security unit can be realized as a secure cryptoprocessor, in which at least one physical security measure is provided as a protection mechanism, as is known, for example, for smart cards. Designs, in which the stored key information is automatically destroyed if the physical integrity of the security unit is destroyed, are also conceivable as protection mechanisms. Protection mechanisms can also comprise shielding layers that prevent the reading of internal signals and the like.

Within the scope of the present-disclosure it is basically conceivable to directly use the hardware-encoded key information in order to perform the decryption/encryption of the user data, and so a negotiation of a session key to be used for a communication session is not necessary. However, with regard to the authentication, it has proven expedient if the authentication arrangement is designed for negotiating a session key to be used for a communication session on the basis of the key information, particularly after a mutual authentication in the course of an authentication process using the key information. In this case, it will usually be the case that the security units communicate via the communication connection in order to agree on a session key and, if necessary, also separately in case of an authentication process. The key information serves in this case as "shared information," i.e., shared information, which is to be used as basis for the authentication and/or the negotiations and/or the generation of the session key in order to allow for the authentication by the authentication arrangements. For that purpose, different options for negotiating a key are conceivable, particularly also asymmetric negotiation methods, for example, the Diffie-Hellman methods. It is also conceivable that the negotiation of the session key can be understood as an authentication process if no explicit authentication is connected upstream or interposed. In other words, the authentication process now provides the "session key."

In some embodiments, in the case of symmetrical key information which comprises at least one identical base key for each data processing device, a plurality of base keys is provided, and/or the security unit is designed to derive different subkeys from the base key. There is a great number of reasons for providing different base keys. For example, the authentication can be adapted via the base keys according to further criteria, for example, a different key can be provided for different models of the whole apparatus in order to also allow for a distinction in terms of the authentication. In general, a key to be used can be selected using a property of the whole apparatus and/or a usage parameter describing the use of the whole apparatus. In addition to the described example of the different models of the whole apparatus, it is also conceivable, for example, to provide country-specific and/or region-specific base keys, by means of which the different local circumstances can be taken into account and/or a locally different behavior can be effected. It is also conceivable to assign a certain durability and/or a certain interval to the keys, so that, for example, base keys are available for specific validity intervals. In such case, it is particularly advantageous if the multiple base keys as a key tree are based on a non-stored and/or secret root key never directly used. In this manner, the multiple base keys can thus be derived from a common, secret and thus a specifically securable root key that does not have to be used even outside of the security unit. Consequently, the root key is not passed on to the outside of the security unit. A further increase in security is conceivable, for example, in that temporally valid base keys are derived from the root key, and the like.

The security unit can be designed as a one-chip system with the computation unit and/or the interface unit or as a separate security chip. Specifically, it can be provided that the security unit is designed as a trusted zone of the one-chip system or as an embedded security element of the one-chip system or as a trusted platform module (TPM). Even in the case of one-chip systems (SoC), measures/mechanisms are already known for preventing access of a general operating system, for example, an operating system of the computation unit and/or the interface unit, to a specific hardware segment, particularly a trusted zone and/or an embedded security element. For example, technologies are known, in which routine messages/operations are transmitted with 32-bit technology, while in a trusted hardware segment of the one-chip system, a 33-bit is additionally used to identify the secure portions ("SecureBit"). Corresponding technologies can also be used within the scope of the present disclosure in order to allow for particularly compact embodiments of the data processing device.

The innovations according to the disclosure can be used particularly advantageously within a motor vehicle as a whole apparatus, wherein at least one data processing device is a control device. Modern motor vehicles usually have complicated data processing systems which are supposed to meet the highest requirements, particularly with regard the control devices concerned. It must be noted, however, that the data processing devices in a motor vehicle as the whole apparatus do not necessarily have to be control devices; instead, it is quite conceivable to integrate other data processing devices, for example, sensors, display devices, operating elements, bridge devices, and the like.

Especially in motor vehicles as well as in whole apparatuses in general, it can be expedient if the key information is whole apparatus-specific in order to further increase security. The key information can then be made available in a database by a manufacturer, for example, in order to be able to purposefully control expansions and/or replacements with respect to the data processing systems of the whole apparatuses.

In addition to the whole apparatus, the present disclosure also relates to a method for authenticating a communication connection, using a communication protocol, between two data processing devices of a whole apparatus of the type according to the disclosure by an encryption mechanism, wherein the encryption of the user data takes place on the basis of the key information. All descriptions relating to the whole apparatus according to the disclosure can be analogously applied to the method according to the disclosure, with which the already mentioned advantages can thus also be obtained.

Figure 2:
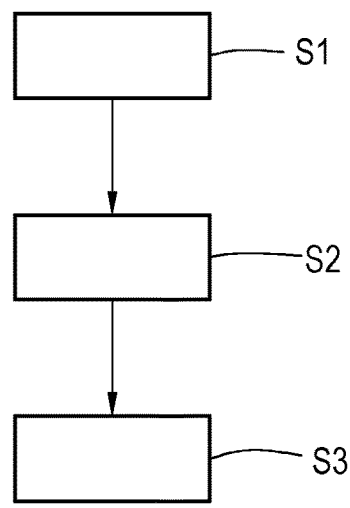
FIG. 2 shows a flowchart of an embodiment of the method, according to some embodiments of the disclosure.
Figure 3:
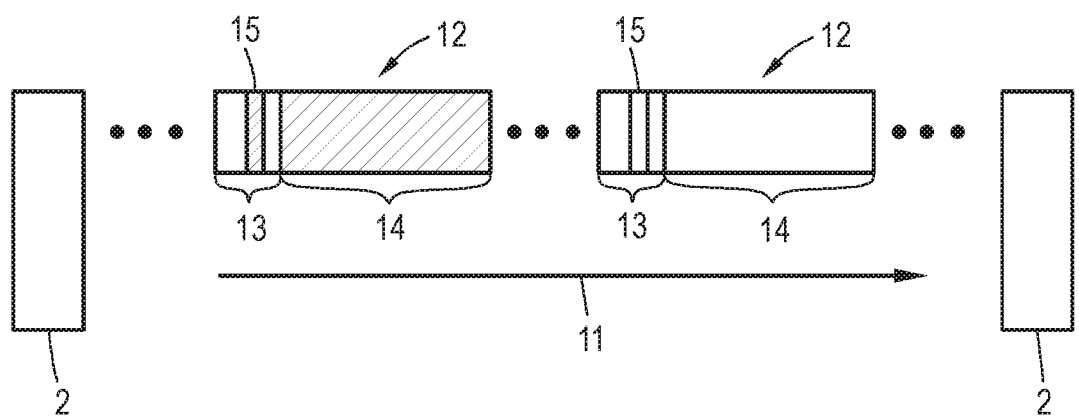
FIG. 3 shows a diagram for partial encryption, according to some embodiments of the disclosure.

Further advantages and details of the present disclosure will become apparent from the embodiments described below and by means of the drawings, in which:

FIG. 1 shows a schematic diagram of a whole apparatus according to the disclosure;

FIG. 2 shows a flowchart of an embodiment of the method according to the disclosure;

FIG. 3 shows a diagram for partial encryption; and

Figure 4:
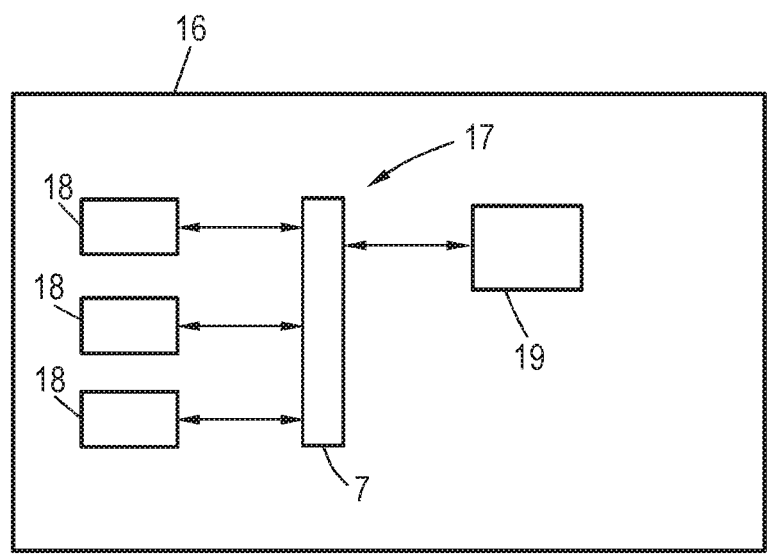
FIG. 4 shows a motor vehicle as a whole apparatus, according to some embodiments of the disclosure.

FIG. 4 shows a motor vehicle according to the disclosure as a whole apparatus.

FIG. 1 shows an embodiment of a whole apparatus 1 according to the disclosure. By way of example, it has two depicted data processing devices 2, each having have a computation unit 3, for example, a CPU. The computation unit 3 can, for example, provide a rich execution environment with an operating system which can manage the interrupt handling, drivers, applications, and the like. The data processing devices 2 are supposed to be able to communicate with one another via a PCIe communication connection 4, for which reason they each have an interface unit 5 which can be designed as a PCIe microchip and which has an interrupt and user data connection 6 to the computation unit 3, as is basically known. For that purpose, it is not essential whether the communication connection 4 runs directly or via a bridge device 7, only indicated herein, which can be designed as a switch, hub, multiplexer/demultiplexer, or the like, wherein it must be noted that a bridge device 7 itself can naturally also count as a data processing device and be designed in accordance with the data processing devices 2, in which case an authentication can take place over sections of the communication connection 4, which, however, is less preferred.

As part of an authentication arrangement, an encryption/decryption device 8 produced by hardware is integrated in the interface unit 5, which in this case can encrypt or decrypt user data for the communication session on the basis of a negotiated session key. In this case, the encryption/decryption device must be assigned to the transaction layer of the PCIe communication protocol. In other words, the encryption/decryption is applied to the data to be transported physically (TLPs—Transaction Layer Packets).

The session key is negotiated via a further component of the authentication arrangement, namely a security unit 9, which in this case is provided as a separate microchip, specifically as a trusted platform module (TPM), but it can also be provided as a trusted zone or security element on a microchip that realizes the computation unit 3 and/or the interface unit 5. It is essential that both the operating system of the security unit 9 and a key information 10 stored in the security unit 9 are hardware-coded and thus unalterable, wherein, in the present case, said key information 10 comprises at least one base key which is identical for both data processing devices 2. The security unit 9 therefore forms a trusted runtime environment, thus a so-called trusted execution environment (TEE) which cannot be accessed in a controlling or influencing manner particularly by the respective computation unit 3. The trusted operating system of the security unit 9 executes all security-relevant calculations, in this case particularly the management of the key information 10 and the negotiation of a session key, which is subsequently determined as "shared information" on the basis of the key information 10, and so an encrypted communication between the data processing devices 2 is possible only in case of a corresponding or matching key information 10, which constitutes an authentication. If an encryption is possible, both data processing devices 2 thus know that the respective communication partner is authorized, and so a mutual authentication is provided. Added and/or modified data processing devices which do not have the key information 10 can thus be detected and identified as an unauthorized device. It is also conceivable to provide an authentication process separate from the key negotiation, for example, upstream of and a requirement for the key negation. As a result, the key information does not necessarily have to be included in the session key or its negotiation.

Since a symmetric base encryption is present in this case, it must additionally be noted that it is also possible to use a plurality of base keys which can be derived particularly from a rootkey which never leaves the security unit 9. In this manner, different base keys for different models of the whole apparatus 1, different countries and/or regions and/or different time periods can be created to further increase security. It is further preferred if the base key (serving particularly as a rootkey) of the key information 10 is whole apparatus-specific, i.e., a separate, individual rootkey and thus a separate, individual key information 10 is present for each whole apparatus 1.

It must also be noted that the respective security units 9 have at least one protection mechanism which makes it at least difficult to access the key information 10 by manipulating the security unit 9 itself.

FIG. 2 shows a flow chart of an embodiment of the method according to the disclosure, as it can be executed in the whole apparatus 1. In a step S1, for example, both data processing devices 2 can be initialized, for example, booted up, whereupon both the computation unit 3 and the security unit 9 are also started. This is also regarded as the start of a communication session, and so in a step S2, the security units 9 together negotiate a session key for the communication session via the communication connection 4, wherein here, too, an encryption can already take place using the key information 10 and the respective encryption/decryption device 8. In any case, the session key is negotiated using the key information 10 or is derived therefrom.

In this sense, step S2 can also be understood to be an authentication process because either the negotiation of the session key will fail immediately or the communication with encrypted data will fail later, thus clearly indicating that the communication partner is not correctly authenticated.

In a step S3, the session key can then be used to communicate in an encrypted manner. In such case, it is not necessarily required to encrypt each user data packet, in this case specifically a TLP, but a partial encryption is also conceivable, as shall be explained in more detail by FIG. 3, in which the data transport 11 between the data processing devices 2 is indicated, wherein two different user data packets 12 (TLPs) are shown. Each of the user data packets 12 comprises at least one header 13 and user data 14 (payload). The header 13 now contains one information unit 15, for example, an encryption bit which, when it is set, indicates that the user data 14 are encrypted (cf. hatching in the left user data packet 12), and if it is not set, indicates that the user data 14 are not encrypted; cf. the right user data packet 12 and the correspondingly missing hatching.

The rate of the user data packets 12 containing encrypted user data 14 can also be adapted dynamically, for example, on the basis of a desired data transfer rate.

Finally, FIG. 4 schematically shows a motor vehicle 16 as the whole apparatus 1. The motor vehicle 16 has a data processing system 17 which is associated with a plurality of control devices 18 as data processing devices 2 and further components 19 as data processing devices 2, for example, sensors and display devices. At least one bridge device 7, which, e.g., can act as a multiplexer/demultiplexer, is provided.

The invention claimed is:

1. An apparatus with an authentication arrangement for a communication connection, comprising:
   at least two data processing devices, configured to communicate with each other using a communication protocol, wherein each data processing device comprises:
      a computation unit;
      an interface unit comprising an encryption/decryption device, wherein the encryption/decryption device:
         is at least partially produced by hardware for encrypting user data to be transmitted via the communication connection as part of the authentication arrangement; and
         applies encryption or decryption, in a communication layer of the communication protocol, to the user data prepared for physical user data transmission, or to physically received user data, wherein the communication protocol is packet-based; and
         only one portion of the user data packets to be transmitted is encrypted, wherein an encryption state in an information unit of a header of the user data packets is displayed; and
      a security unit, wherein the security unit:
         is implemented as dedicated hardware that the computation unit cannot access, and/or logically isolated from the computation unit, and
         is configured to produce a trusted execution environment of the authentication arrangement with a hardware-encoded key information,
            wherein the user data are encrypted, by the encryption/decryption device, on a basis of the hardware-encoded key information.

2. The apparatus according to claim 1, wherein the communication layer is a transport layer and/or a transaction layer.

3. The apparatus according to claim 1, wherein the communication protocol is PCI Express.

4. The apparatus according to claim 1, wherein the encrypted portion of user data packet is dynamically or user adjustable.

5. The apparatus according to claim 1, wherein the security unit comprises at least one protection mechanism against a reading or reading out of the hardware-encoded key information.

6. The apparatus according to claim 1, wherein the authentication arrangement is designed for negotiating a session key to be used for a communication session on the basis of the hardware-encoded key information.

7. The apparatus according to claim 1, wherein the hardware-encoded key information is a symmetrical key information, which comprises an identical base key for each data processing device.

8. The apparatus according to claim 7, wherein the apparatus is configured to provide a plurality of base keys to derive different subkeys.

9. The apparatus according to claim 7, wherein the security unit is designed to derive different subkeys from the identical base key.

10. The apparatus according to claim 7, wherein the apparatus is configured to select a key using a property of the apparatus and/or a usage parameter of the apparatus.

11. The apparatus according to claim 1, wherein the security unit is designed as a one-chip system that includes the computation unit and/or the interface unit.

12. The apparatus according to claim 11, wherein the security unit is designed as a trusted zone of the one-chip system.

13. The apparatus according to claim 11, wherein the security unit is designed as an embedded security element of the one-chip system.

14. The apparatus according to claim 11, wherein the security unit is designed as a trusted platform module.

15. The apparatus according to claim 1, wherein the apparatus is a motor vehicle.

16. The apparatus according to claim 15, wherein at least one of the at least two data processing devices is a control device.

17. A method for implicitly authenticating a communication connection between at least two data processing devices of an apparatus, the method comprising:
  implementing a security unit as dedicated hardware that a computation unit cannot access;
  producing, by the security unit, a hardware-encoded key information for a trusted execution environment for the implicitly authenticating of the communication connection;
  producing, at least partially by hardware, an encryption/decryption device in an interface unit for the communication connection;
  encrypting, by the encryption/decryption device, user data on a basis of the hardware-encoded key information;
  applying, in a communication layer of a communication protocol, encryption or decryption to user data prepared for physical user data transmission, or to physically received user data, wherein:
    the communication protocol is packet-based; and
    only one portion of user data packets to be transmitted is encrypted, wherein an encryption state in an information unit of a header of the user data packets is displayed; and
  establishing, by the communication protocol, the implicitly authenticated communication connection between the at least two data processing devices of the apparatus.

18. The method according to claim 17, wherein the implementing of the security unit comprises logically isolating the security unit from the computation unit.

* * * * *